July 21, 1970 A. SLOB 3,521,086
CIRCUIT ARRANGEMENT FOR LIMITING THE OUTPUT VOLTAGE OF A LOGICAL CIRCUIT
Filed June 5, 1967
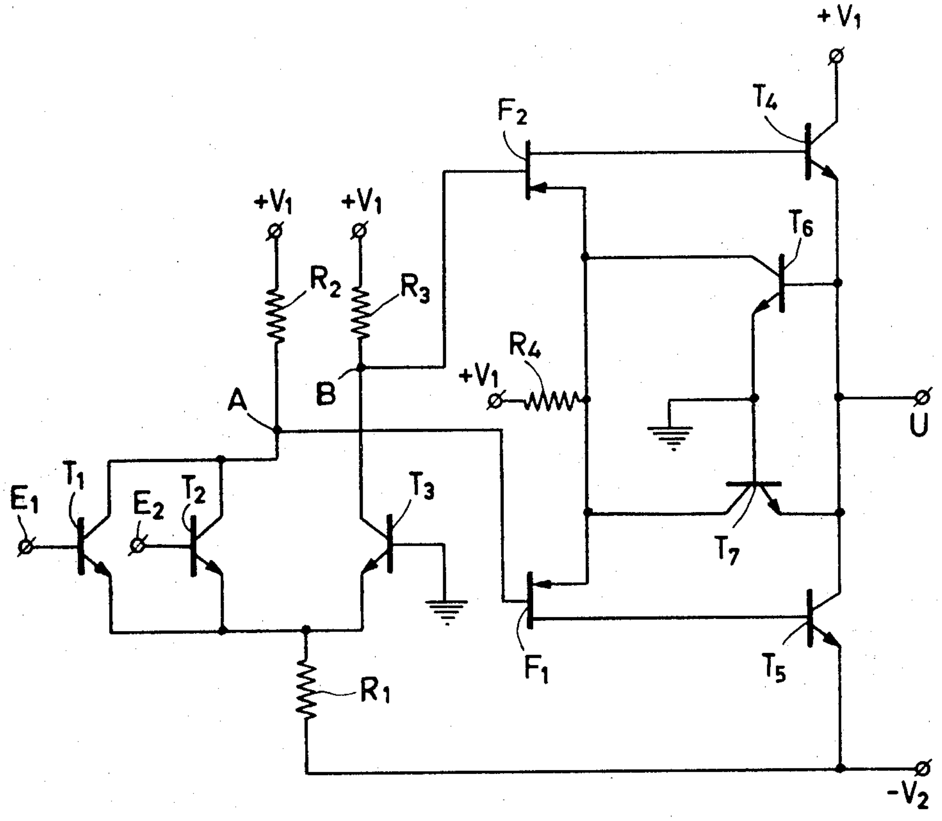
INVENTOR.
ARIE SLOB
BY
Frank R. Jerifari
AGENT

United States Patent Office 3,521,086

Patented July 21, 1970

3,521,086

CIRCUIT ARRANGEMENT FOR LIMITING THE OUTPUT VOLTAGE OF A LOGICAL CIRCUIT

Arie Slob, Emmasingel, Eindhoven, Netherlands, assignor, by mesne assignments, to U.S. Philips Corporation, New York, N.Y., a corporation of Delaware Filed June 5, 1967, Ser. No. 643,552

Claims priority, application Netherlands, June 29, 1966, 6609004

Int. Cl. H03k 5/08

U.S. Cl. 307—237 2 Claims

ABSTRACT OF THE DISCLOSURE

A circuit arrangement for maintaining the output signal of a logic circuit at a non-varying value with respect to a voltage reference point in which the input logic element branches are connected to an output point through an amplifier. The output point is maintained at the non-varying value by being connected to the reference point through the base-emitter barrier layer of a transistor the collector of which is connected to the amplifier in negative feedback relationship.

The invention relates to a circuit arrangement for limiting the voltage at an output of a logical circuit, which voltage is applied to the output through an amplifier. Such logical circuits are preferably constructed in the form of integrated circuit assemblies.

In practical uses of logical circuits in computers and the like the output terminals are connected to input terminals of further similar circuit units, which means that a number of such circuits are connected in cascade.

In this connection the level of the voltages at the output terminals should be the same as that of the input terminals and moreover the same as that of the input and output terminals of the further logical circuits in the computer. It is important to be able to adjust the various voltages with respect to a fixed reference potential, which is the same also for remote parts of the computer. In principle, the reference potential may be formed by the potential of the terminals of a supply battery or a tapping of a potentiometer connected across the battery, but in this case the equality of the reference potential at different points of the computer is not guaranteed on account of tolerances of resistances and voltage drops across supply conductors. In practice the reference potential is commonly formed by the optential of the chassis (earth=zero volt), since no potential differences occur in the chassis due to its low resistance.

The variation of the control-voltages should not be excessively high, since otherwise transistors might be driven into saturation, which, as is known, adversely affects the switching rate.

It is known to limit the voltage of an output both in downward and in upward direction by connecting two semiconductor diodes polarized in opposite directions between said point and a point of fixed reference potential. If the potential difference between the output point and the reference point should exceed the internal threshold value of the diodes, one of the diodes becomes conducting so that the two points are substantially short-circuited relatively to each other, so that the voltage of the output point in both directions is limited practically to the internal threshold value of the diodes. With silicon diodes this threshold value is about 0.7 v., which is a suitable value of control-voltage in integrated circuits.

However, this known solution has the great inconvenience that also on account of the fairly high tolerances of resistances and parameters of transistors in integrated circuits and the fluctuation of supply voltage comparatively high currents might, under certain conditions, pass through the diodes, which may thus be destroyed.

The invention obviates this drawback and provides a circuit arrangement that can be readily integrated.

According to the invention the base-emitter barrier layer of a transistor is connected between the output point and the point of fixed reference potential, the collector of said transistor being negatively fedback to the amplifier.

This circuit arrangement is particularly suitable for use in emitter-coupled logical circuits.

The invention will be described more fully with reference to an embodiment shown in the drawing, particularly suitable for an integrated circuit.

The figure shows an emitter-coupled logical circuit having a number of input transistors $T_1$, $T_2$, the emitters of which are connected to each other and to the emitter of a transistor $T_3$ and, through a common resistor $R_1$ to a voltage source $-V_2$, for example $-1.5$ v. The collectors of the transistors $T_1$, $T_2$ are connected through resistors $R_2$ to a voltage source $+V_1$, for example $+4.5$ v. Likewise the collector of the transistor $T_3$ is connected through the resistor $R_3$ to the source $+V_1$.

Emitter-coupled circuits of this kind are known and the number of parallel-connected input transistors $T_1$, $T_2$ is in general greater than 2, for example 5.

Input control-voltages can be fed through the input terminals $E_1$, $E_2$ to the base electrodes of the transistors $T_1$, $T_2$, whereas output voltage can be derived from points A and B having output voltages varying in opposite senses.

If all input voltages at the points $E_1$, $E_2$ are low, the transistors $T_1$ and $T_2$ are cut off, whereas the transistor $T_3$ is conducting so that the points A and B have a high and a low potential respectively.

However, if one or more of the input points $E_1$, $E_2$ has a comparatively high potential, the relevant input transistor is conducting, whereas the transistor $T_3$ is cut off, so that the points A and B are at a low and a high potential respectively. In known circuits of this kind, the points A and B are coupled with output terminals through transistors forming emitter-followers and united with the further transistors as integrated circuits.

However, in the arrangement shown the points A and B are connected via the field-effect transistors $F_1$, $F_2$ to the bases of the transistors $T_5$ and $T_4$. The gate electrodes of the transistors $F_1$ and $F_2$ are connected to the points A and B, whereas the drain electrodes are connected to the base electrodes of the transistors $T_5$ and $T_4$ respectively and the source electrodes are connected to each other and through the resistor $R_4$ to the supply point $+V_1$. The relevant field effect transistors have mainly for their object to reduce the potentials of the base electrodes of the transistors $T_4$ and $T_5$ by a suitable amount with respect to the points B and A and thus to bring them to a suitable level.

The transistors $T_4$ and $T_5$ form an output push-pull connection. The emitter of the transistor $T_4$ is connected to the collector of the transistor $T_5$ and to the output terminal U. The emitter of the transistor $T_5$ is connected to the supply source $-V_2$.

As stated above, the points A and B are at a high and low potential respectively as long as the voltage at all input terminals $E_1$, $E_2$ is low, for example, —0.7 v., so that the field-effect transistors $F_1$ and $F_2$ are cut off and conducting respectively and the transistor $T_4$ is conducting and the transistor $T_5$ is cut off. The output voltage U then has a fairly high voltage. Conversely, if one or more of the input points $E_1$, $E_2$ are at a high voltage, for example $+0.7$ v., the transistor $T_4$ is cut off and the transistor $T_5$ is conducting, so that the voltage at the output terminal U is comparatively low.

It will be obvious that if no further precautions were taken the voltages at the output point would not at all be fixed due to unavoidable tolerances of the values of the resistors $R_2$ and $R_3$, etc.

Between the output terminal U and earth (reference voltage) are connected the base-emitter barrier layers of the transistors $T_6$, $T_7$, whilst the base of transistor $T_6$ and the emitter of the transistor $T_7$ are connected to point U. The collectors of these transistors are connected to each other and to the source electrodes of the field-effect transistors $F_1$ and $F_2$.

If the voltage at point A is high and that of the point B is consequently low, the voltage at the output U is comparatively high. The transistors $T_4$, $T_6$ and $F_2$ then pass current and the transistors $T_5$, $T_7$ and $F_1$ are cut off.

The voltage at point U to earth is then about +0.7 v., that is to say, equal to the internal threshold voltage of the transistor $T_6$. If the voltage at point U should increase slightly, the base current of transistor $T_6$ rises, so that also the collector current of said transistor increases. However, the voltage of the source electrode of the field-effect transistor $F_2$ is thus decreased, so that the voltage increase at point U is counteracted or in other terms a negative feedback is obtained.

If conversely the voltage of point A is low and that at point B is high, the transistors $T_4$, $T_6$ and $F_2$ are cut off and the transistors $T_5$, $T_7$ and $F_1$ are conducting, whilst the voltage at point U is equal to −0.7 v. If the voltage at point U varies, for example, in a negative sense, the base and collector currents and the voltage of the transistor $T_7$ increase, so that the voltage of the source electrode of the transistor $F_1$ is reduced and the voltage variation at point U is counteracted.

I claim:

1. A circuit arrangement for limiting the voltage on an output terminal of a switching transistor in a logic circuit, wherein the output terminal of the switching transistor is connected directly to the output terminal of the logic circuit, comprising a stabilizing transistor having a base-emitter path and a collector terminal, the base-emitter path of the stabilizing transistor having a threshold voltage, an impedance path consisting solely of the base-emitter resistance of the stabilizing transistor and connecting the output terminal of the switching transistor directly to a reference voltage, whereby the base-emitter path of the stabilizing transistor conducts in response to a voltage on the output terminal of the switching transistor in excess of the sum of the reference voltage and the threshold voltage, and negative feedback path means connecting the collector of the stabilizing transistor to the switching transistor for inhibiting the conduction of the switching transistor in response to the conduction of the base-emitter path of the stabilizing transistor.

2. A circuit arrangement as claimed in claim 3 for limiting the output voltage of an emitter-coupled logical circuit having a plurality of input transistors, whose interconnected emitters together with an emitter of a further transistor are fed through a common resistor further comprising a first and a second field-effect transistor, a second switching transistor and a second stabilizing transistor, wherein the collector of the further transistor is coupled through the first field-effect transistor to the base of the first switching transistor, and the interconnected collectors of the input transistors are coupled through the second field-effect transistor with the base of the second switching transistor, the collector of the first switching transistor being the output terminal thereof, means for connecting the collector of the second switching transistor directly to the emitter of the first switching transistor and to the output terminal of the logic circuit and, furthermore to the base electrode of the first stabilizing transistor and to the emitter of the second stabilizing transistor, the emitter of the first stabilizing transistor and the base of the second stabilizing transistor being connected to the point of fixed reference potential wherein the source electrodes of the field-effect transistors are connected and wherein the collectors of the stabilizing transistors are connected to the interconnected source electrodes of the field-effect transistors.

References Cited

UNITED STATES PATENTS

| | | | |
|---|---|---|---|
| 3,023,368 | 2/1962 | Erath | 330—28 XR |
| 3,148,337 | 9/1964 | Spohn | 330—28 |
| 3,217,237 | 11/1965 | Giger | 307—297 XR |
| 3,226,653 | 12/1965 | Miller | 328—175 XR |
| 3,360,734 | 12/1967 | Kimball | 330—28 XR |
| 3,368,156 | 2/1968 | Kam | 330—28 XR |

STANLEY T. KRAWCZEWICZ, Primary Examiner

U.S. Cl. X.R.

307—203, 297; 328—175; 330—28